US012739022B2

(12) United States Patent
Lee et al.

(10) Patent No.: US 12,739,022 B2
(45) Date of Patent: Sep. 15, 2026

(54) SYSTEMS AND METHODS FOR EXTENDING SATELLITE COVERAGE

(71) Applicant: Hughes Network Systems, LLC, Germantown, MD (US)

(72) Inventors: Lin-Nan Lee, Germantown, MD (US); Bill Whitmarsh, Germantown, MD (US); Victor Liau, Germantown, MD (US)

(73) Assignee: Hughes Network Systems, LLC

( * ) Notice: Subject to any disclaimer, the term of this patent is extended or adjusted under 35 U.S.C. 154(b) by 405 days.

(21) Appl. No.: 18/148,567

(22) Filed: Dec. 30, 2022

(65) Prior Publication Data

US 2024/0171265 A1 May 23, 2024

Related U.S. Application Data

(60) Provisional application No. 63/427,721, filed on Nov. 23, 2022.

(51) Int. Cl.
*H04B 7/185* (2006.01)
*H01Q 3/04* (2006.01)

(52) U.S. Cl.
CPC ..... *H04B 7/18519* (2013.01); *H04B 7/18513* (2013.01); *H01Q 3/04* (2013.01)

(58) Field of Classification Search
CPC ........ H04B 7/185–195; H04B 7/18513; H04B 7/18519; H01Q 3/04
See application file for complete search history.

(56) References Cited

U.S. PATENT DOCUMENTS

| | | | | |
|---|---|---|---|---|
| 6,081,227 A * | 6/2000 | Haber | H01Q 1/288 455/13.3 |
| 8,880,246 B1 * | 11/2014 | Karpenko | B64G 1/36 701/13 |
| 11,738,888 B2 * | 8/2023 | Filipi | B64G 1/26 244/165 |
| 2008/0215789 A1 * | 9/2008 | Matsuda | G06F 13/28 710/308 |
| 2010/0179711 A1 * | 7/2010 | Munir | B64G 1/242 244/158.6 |
| 2012/0184208 A1 * | 7/2012 | Renouard | H04B 7/18521 455/12.1 |
| 2016/0149599 A1 * | 5/2016 | Lindsay | H04B 7/195 455/13.1 |
| 2017/0026109 A1 | 1/2017 | Wyler | |
| 2017/0302377 A1 | 10/2017 | Boronson et al. | |
| 2019/0237868 A1 * | 8/2019 | Fang | H03F 1/02 |
| 2021/0385377 A1 | 12/2021 | Williams, Jr. | |

(Continued)

OTHER PUBLICATIONS

International Search Report and Written Opinion for PCT/US2023/024024, mailed on Oct. 13, 2023.

(Continued)

*Primary Examiner* — Raymond S Dean
(74) *Attorney, Agent, or Firm* — Spencer Fane, LLP

(57) ABSTRACT

Satellite communication systems and methods are disclosed herein. In an embodiment, a satellite communication method includes providing a satellite communication system including a plurality of satellites having inclined orbits, and adjusting a tilt of at least one antenna on at least one satellite of the plurality of satellites so as to increase satellite coverage at a target region.

16 Claims, 13 Drawing Sheets

(56) References Cited

U.S. PATENT DOCUMENTS

2022/0128708 A1 4/2022 Lee et al.
2023/0006732 A1 * 1/2023 Hou .................. H04B 7/18541

OTHER PUBLICATIONS

Goldreich, Inclination of Satellite Orbits about an Oblate Precessing Planet; Astronomical Journal, vol. 70, No. 1; Feb. 28, 1965.

* cited by examiner

NPR
IO
12
P2
E
P3
CA
SPR
Earth's rotation around equator

Inclination Angle
12
P1
NPR
IO
Pe
CA
SPR
P4
E
Earth's rotation around equator

SYSTEMS AND METHODS FOR EXTENDING SATELLITE COVERAGE

PRIORITY

This application claims priority to U.S. Provisional Application No. 63/427,721, filed Nov. 23, 2022, entitled "Systems and Methods for Extending Satellite Coverage", the entire contents of which is incorporated herein by reference and relied upon.

BACKGROUND

Field of the Disclosure

The present disclosure generally relates to systems and methods for controlling a satellite. In particular, the present disclosure relates to systems and methods for extending satellite coverage.

Background Information

Inclined orbit constellations are popular for Low Earth Orbit (LEO) satellite networks because a higher percentage of its satellites can be used to cover the world user population more efficiently than polar orbit constellations. The degree of inclination for the satellites in inclined orbit constellations is often chosen based on the northern limit of the intended coverage. However, coverage in the polar regions is important to specialized user populations such as government and military resource extraction and environmental monitoring. Some LEO networks utilizing inclined orbit constellations add a second constellation specifically for pole coverage. The additional constellation is expensive because it requires a sizable number of satellites to ensure continuity of services.

SUMMARY

The present disclosure provides systems and methods for controlling one or more satellites in an inclined orbit constellation to increase satellite coverage, for example, to extend satellite coverage to the polar regions or other target regions. The systems and methods of the present disclosure can be applied to existing inclined orbit constellations to increase coverage while avoiding additional cost associated with adding satellites to cover the polar regions, eliminating the need for an additional polar constellation. The existing constellations can include satellites with phase array antennas that do not move independently of the satellite body mass as a whole.

In an embodiment, the systems and methods of the present disclosure cause the boresight of a satellite antenna to tilt slightly north (with respect to the direction towards the center of Earth) when the satellite is ascending from south to north to extend coverage toward the north pole. Since such a satellite circulating around the earth in an inclined orbit also has a north-to-south descending half cycle, the systems and methods of the present disclosure also cause the boresight of the satellite antenna to tilt slightly south when the satellite is descending north to south to extend coverage toward the south pole. In an embodiment, the systems and methods of the present disclosure determine the amount of tilt as a function of the inclination of the inclined orbit, the height of the orbit, the field of view of the satellite antenna, and/or the desired coverage extension in latitude. In an embodiment, the tilting in accordance with the present disclosure can also make the scan loss of the array antenna on the satellite smaller, thus increasing the strength of the signal in both directions.

In view of the state of the known technology, one aspect of the present disclosure is to provide a satellite communication method. The method includes providing a satellite communication system including a plurality of satellites having inclined orbits, and adjusting a tilt of at least one antenna on at least one satellite of the plurality of satellites so as to increase satellite coverage at a target region.

Another aspect of the present disclosure is to provide a satellite communication system. The satellite communication system includes a plurality of satellites having inclined orbits, and a controller configured to adjust a tilt of at least one antenna on at least one satellite of the plurality of satellites so as to increase satellite coverage at a target region.

Another aspect of the present disclosure is to provide a satellite. The satellite includes a housing, an antenna configured to create a coverage area for communication with user terminals, and a controller configured to adjust a tilt of the antenna as the satellite approaches a target region so as to adjust the coverage area for the target region.

Also, other objects, features, aspects and advantages of the disclosed devices, systems and methods will become apparent to those skilled in the art in the field of satellite systems from the following detailed description, which, taken in conjunction with the annexed drawings, discloses preferred embodiments of devices, systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the appended claims and their equivalents.

Figure 1:
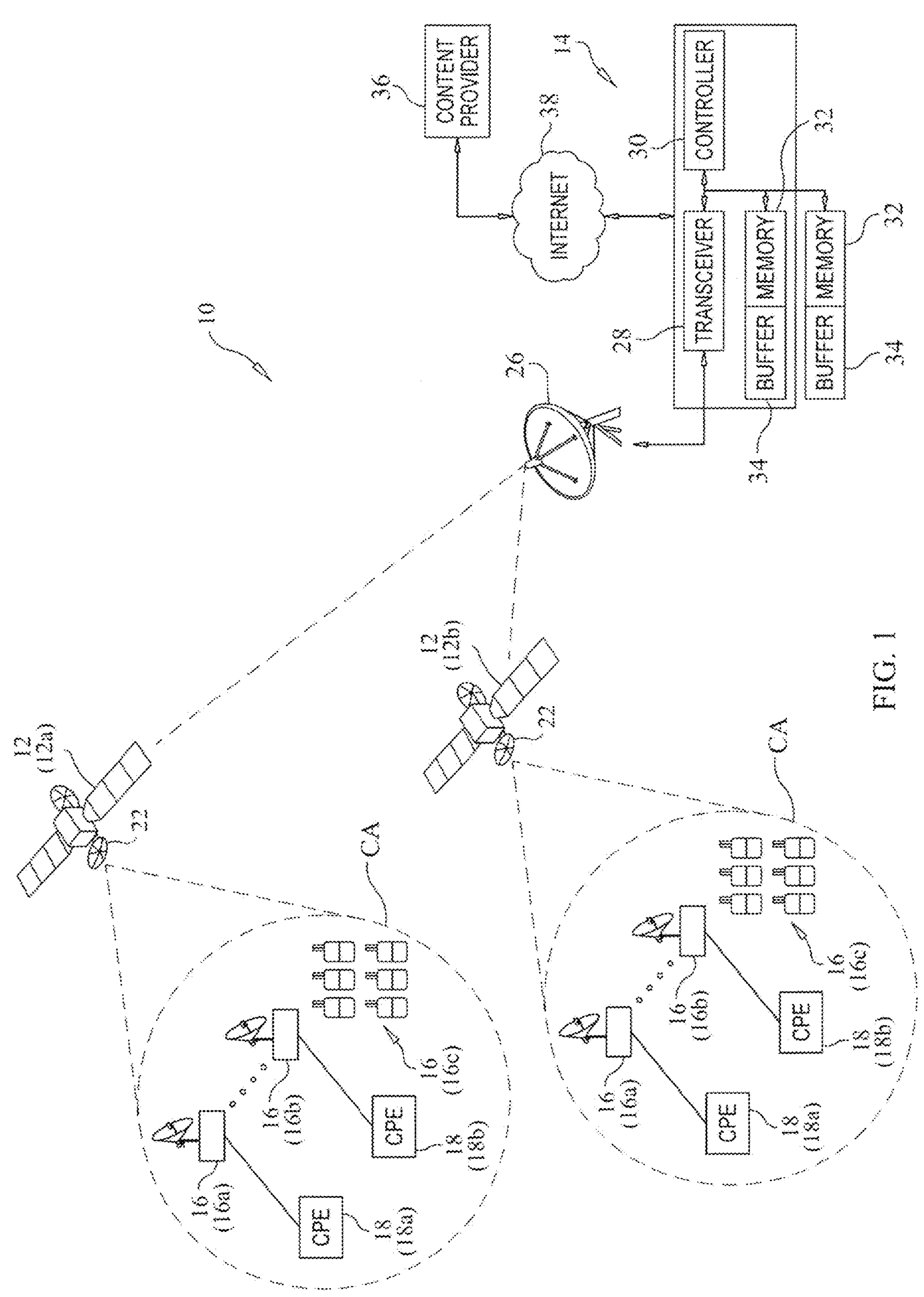
FIG. 1 illustrates an example embodiment of a satellite communication system in accordance with the present disclosure.
Figure 2:
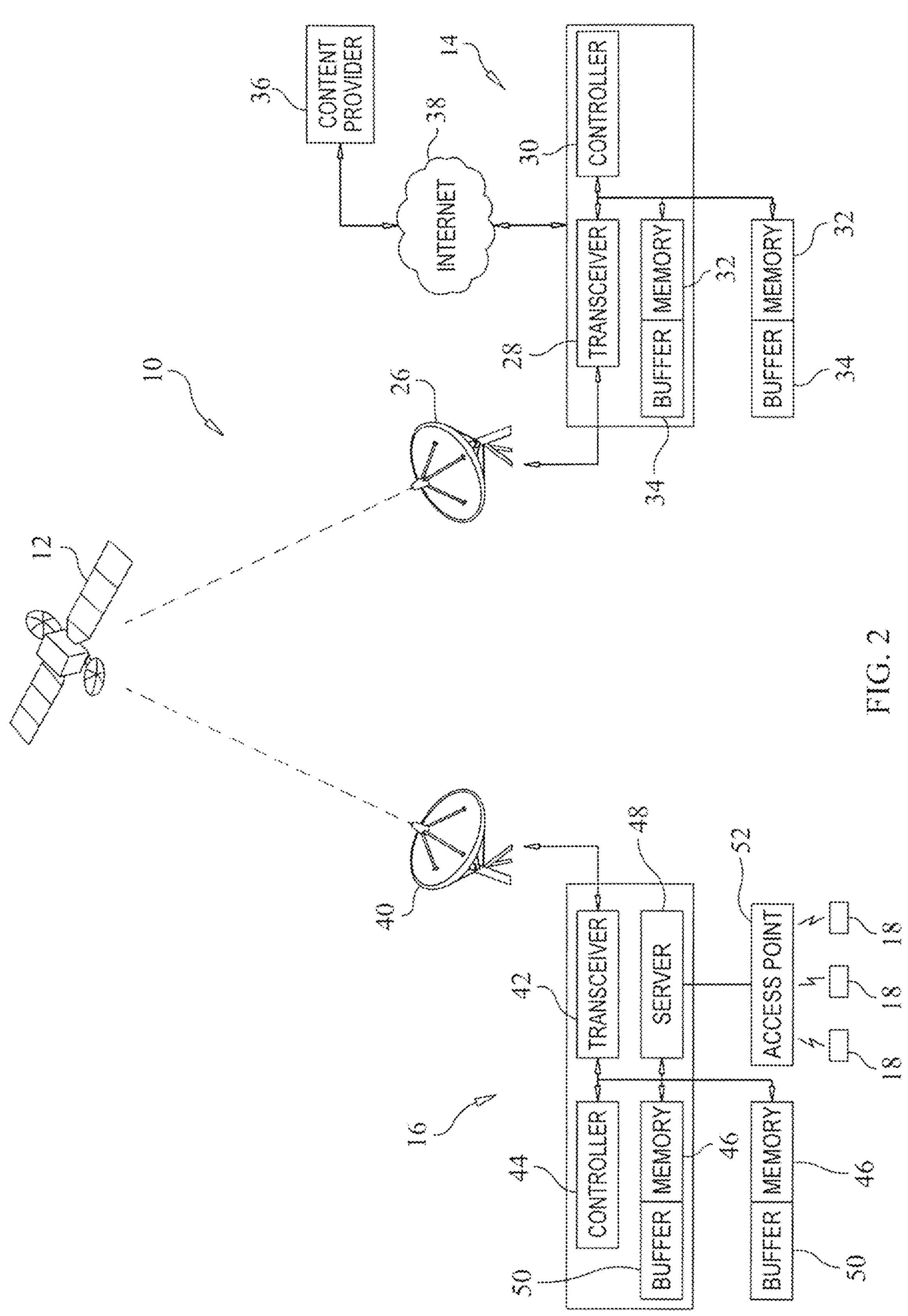
FIG. 2 illustrates another example embodiment of the satellite communication system of FIG. 1.

FIGS. 1 and 2 illustrate an example embodiment of a satellite communication system 10 in accordance with the present disclosure. In the illustrated embodiment, the satellite communication system 10 a Low Earth Orbit (LEO) satellite communication system. More specifically, the satellite communication system 10 is a LEO system having an inclined orbit constellation. In alternative embodiments, the satellite communication system 10 can include a Medium Earth Orbit (MEO) satellite communication system, a hybrid LEO, MEO and/or Geosynchronous Equatorial Orbit (GEO) satellite communication system, or another satellite communication system in which it is desirable to extend satellite coverage as described herein.

The satellite communication system 10 includes a plurality of satellites 12 configured to support communications between one or more gateways 14 (one shown) and a plurality of user terminals 16 (e.g., 16*a*, 16*b*, 16*c*). In FIG. 1, the plurality of satellites 12 includes a first satellite 12*a* and a second satellite 12*b*. Those of ordinary skill in the art will recognize from this disclosure that a typical satellite communication system 10 will include many more satellites 12, but the present disclosure uses two satellites 12*a*, 12*b* to illustrate the systems and methods for simplicity. As illustrated, each satellite 12 has a satellite coverage area CA, for example, as defined by a satellite spot beam as understood in the art. The satellite coverage area. CA of each satellite 12 changes as the satellite 12 orbits the earth. A user terminal 16 within the satellite coverage area CA is enabled to send and/or receive data using radio signals via the satellite 12. Each satellite 12 is configured to relay traffic between one or more gateways 14 and one or more user terminals 16. In an embodiment, a user terminal 16 can also relay traffic between the satellite 12 and customer premise equipment (CPE) 18 (18*a*, 18*b*).

Figure 12:
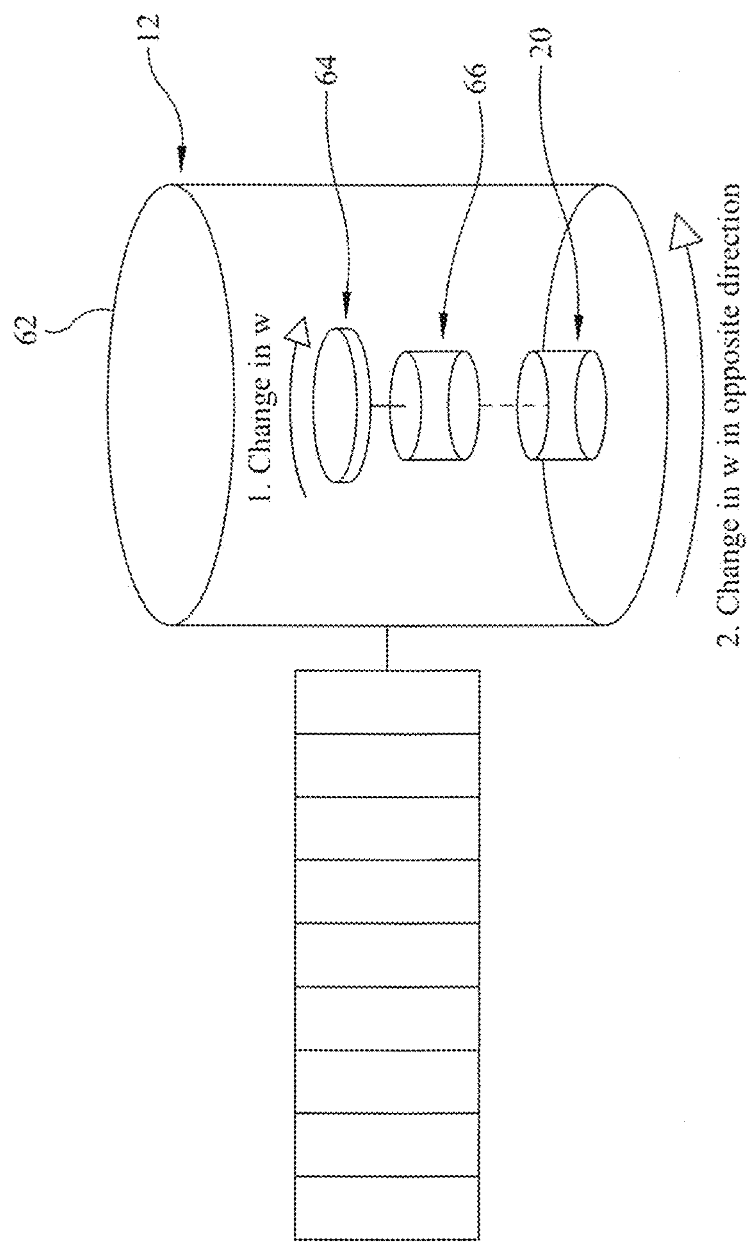
FIG. 12 illustrates an example embodiment of a satellite improved in accordance with the systems and methods of the present disclosure.

Each satellite 12 includes a controller 20 (e.g., shown in FIG. 12). The controller 20 is configured to control the orientation of the satellite antenna boresight as discussed herein. As understood in the art, a controller 20 preferably includes a microcomputer with a control program that controls the satellite 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the satellite 12 as appropriate, in a conventional manner. It will be apparent to those skilled in the art from this disclosure that the precise structure and algorithms for the controller 20 can be any combination of hardware and software that will carry out the functions of the present disclosure.

Figure 3:
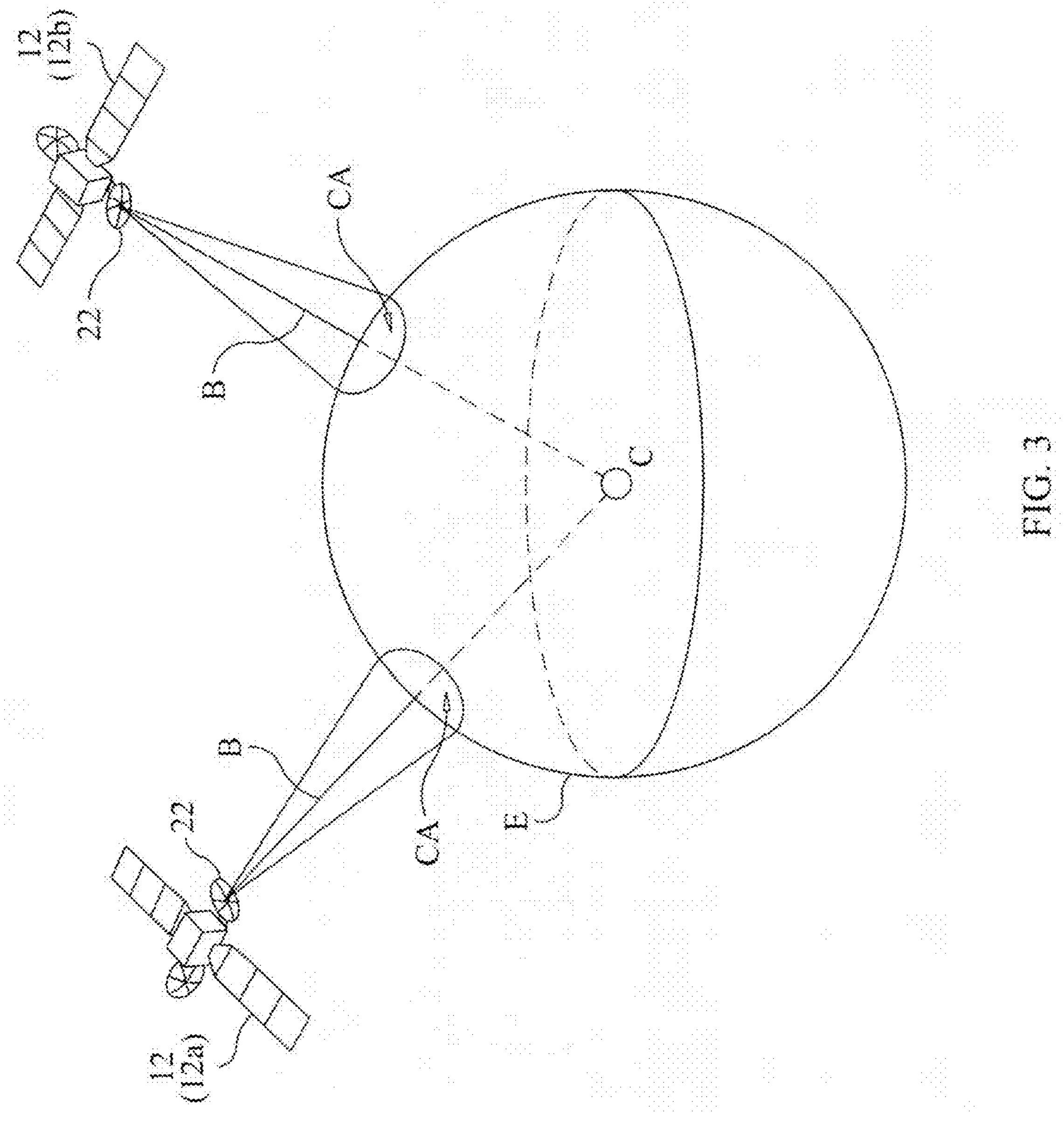
FIG. 3 illustrates another example embodiment of the satellite communication system of FIG. 1.

As illustrated in FIG. 3, each satellite 12 includes at least one antenna 22. The antenna 22 can be for example an S-band, L-band, Ku-band or Ka-band multi-beam antenna. In an embodiment, the antenna 22 is configured for direct communication with cellular phones using cellular bands. For example, the S-band (~2 GHz) and L-band (~1.4-1.6 GHz) allow direct access from regular cellular handsets (or special purpose handsets of similar form factors). In an embodiment, the antenna 22 is a phase array antenna. In an embodiment, the antenna 22 is a direct radiating array antenna, with its beams formed by combining signals from different array elements with different phase and amplitude. In an embodiment, the antenna 22 can be part of the main body of the satellite 12 as opposed to a dish mounted on a gimbal. In another embodiment, the antenna 22 can be mounted to the main body by a gimbal.

The antenna 22 creates the satellite coverage area CA which encompasses an area of the Earth's surface. The coverage area CA depends on the focus of the boresight B of the antenna 22. The boresight B is the axis of maximum gain (maximum radiated power). When the antenna 22 from a satellite 12 is pointed towards the center C of Earth E as shown in FIG. 3, the boresight B is the axis of symmetry of the antenna 12 that is perpendicular to the Earth's surface. As discussed in more detail below, the systems and methods of the present disclosure tilt the boresight B away from the center C of the Earth E to adjust satellite coverage at target regions to enable satellite communication between the gateway 14, the satellite 12, and any user terminals 16 located within the coverage area CA of the satellite 12.

As illustrated in FIGS. 1 and 2, the gateway 14 can include an antenna 26, a transceiver 28, a controller 30, a memory 32 and other types of equipment (not shown) such as amplifiers, waveguides and so on as understood in the art which enable communication between the gateway 14 and one or more user terminal 16 via the plurality of satellites 12. The antenna 26 enables the gateway 14 to communicate via each of the first satellite 12*a* and the second satellite 12*b*. The memory 32 can be, for example, an internal memory in the gateway 14, or other types of memory devices such as flash memory or hard drives with external high speed interface such as a USB bus or an SATA bus, or remote memories such as cloud storage and so on. These other types of memory can be present at the gateway 14 or accessible at a location apart from the gateway 14 via a network connection such as an Ethernet connection, a WiFi connection or any other suitable type of connection as understood in the art. Also, the memory 32 can include at least one buffer 34 which is configured to buffer, for example, data packets to be sent by the gateway 14.

As understood in the art, the controller 30 preferably includes a microcomputer with a control program that controls the gateway 14 as discussed herein. The controller 30 can also include other conventional components such as an input interface circuit, an output interface circuit, and storage devices such as a ROM (Read Only Memory) device and a RAM (Random Access Memory) device. The RAM and ROM store processing results and control programs that are run by the controller 30. The controller 30 is operatively coupled to the components of the gateway 14 as appropriate, in a conventional manner. It will be apparent to those skilled in the art from this disclosure that the precise structure and algorithms for the controller 30 can be any combination of hardware and software that will carry out the functions of the present disclosure. In an embodiment, the controller 30 can send instructions to the controller 20 to instruct the controller 20 how to operate the satellite 12 in accordance with the present disclosure. For example, the controller 30 can send instructions to the controller 20 regarding when and/or where to tilt the boresight B of an antenna 22 in accordance with the present disclosure.

The satellites 12, the gateway 14, and the user terminals 16 typically communicate with each other over a radio frequency link, such as an S-band, L-band, Ku-band link, a Ka-band link or any other suitable type of link as understood in the art, which can generally be referred to as a space link. In an embodiment, the gateway 14 can include or be configured as an inroute group manager, which controls the bandwidth allocations to the user terminals 16 (e.g., on an inroute or inroute group basis) and correspondingly controls and administers the bandwidth allocation approaches. Also, the gateway 14 can include or be configured as a network management system, which, among other things, operates to communicate with remote sites, such as web content providers 36, via the Internet 38, cloud storage, or other communication networks as understood in the art. In addition, gateways 14 can communicate with each other via, for example, the Internet 38 or other communication networks. The satellite communication system 10 will typically include a plurality of gateways 14. In an embodiment, the controller 30 is configured to manage a data packet queue at the gateway 14. In an embodiment, the controller 30 is configured to manage the data packet queue in accordance with a queue management policy stored by the memory 32. In an embodiment, the queue management policy defines one or more rules for controlling a data packet queue at the gateway 14. In an embodiment, the gateway 14 functions partially or solely to control one or more satellite 12 in accordance with one or more methods discussed herein.

A user terminal 16 can be configured to relay traffic to and from customer premise equipment (CPEs) 18 (18*a*, 18*b*). Depending on the embodiment, a CPE 18 can include a portable user device such as a desktop computer, laptop, tablet, cell phone, etc. A CPE 18 can also include connected appliances that incorporate embedded circuitry for network communication which can also be supported by the terminal 16. Connected appliances can include, for example and without limitation, televisions, home assistants, thermostats, refrigerators, ovens, etc. The network of such devices is commonly referred to as the internet of things (IoT).

In a primary embodiment, the user terminals 16 are handheld terminals or cellphones, and the satellite 12 establishes a direct connection to the handheld terminal or cellphone. For example, S-band (~2 GHz) and L-band (~1.4-1.6 GHz) allow direct access to regular cellular handsets (or special purpose handsets of similar form factors).

In another embodiment, the user terminals 16 can be in the form of very small aperture terminals (VSATs) mounted on a structure, habitat, etc. Depending on the specific application, a user terminal 16 can incorporate an antenna dish of different sizes (e.g., small, medium, large, etc.). The user terminals 16 typically remain in the same location once mounted, unless otherwise removed from the mounting. According to various embodiments, the user terminals 16 can be mounted on mobile platforms that facilitate transportation thereof from one location to another. Such mobile platforms can include, for example, cars, buses, boats, planes, etc. The user terminals 16 can further be in the form of transportable terminals capable of being transported from one location to another. Such transportable terminals are operational only after arriving at a particular destination, and not while being transported. The user terminals 16 can also be in the form of mobile terminals that are capable of being transported to different locations by a user. In contrast to transportable terminals, the mobile terminals 16*c* remain operational while users travel from one location to another. In an embodiment, the gateway 14 is configured to route traffic from stationary, transportable, and mobile user terminals (collectively user terminals 16) across the Internet 38. The gateway 14 can be further configured to route traffic from the Internet 38 across the satellite link to the appropriate user terminal 16. The user terminal 16 can then route the traffic to a CPE 18 as appropriate.

As illustrated in FIG. 2, a user terminal 16 can include one or more of an antenna 40, a transceiver 42, a controller 44, a memory 46, a local server 48 and other types of equipment (not shown) such as amplifiers, waveguides and so on as understood in the art which enable communication between the user terminal 16 and one or more gateways 14 via the plurality of orbiting satellites 12. A transceiver 42 can include, for example, an integrated satellite modem and any other suitable equipment which enables the transceiver 42 to communicate with one or more of the orbiting satellites 12 as understood in the art. The memory 46 can be, for example, an internal memory in the terminal 16, or other types of memory devices such as a flash memory or hard drives with external high speed interface such as a USB bus or an SATA bus, or remote memories such as cloud storage and so on. These other types of memory can be present at the user terminal 16 or accessible at a location apart from the user terminal 16 via a network connection such as an Ethernet connection, a WiFi connection or any other suitable type of connection as understood in the art. Moreover, the memory 46 can include at least one buffer 50 which is configured to buffer, for example, received data packets included in communication signals transmitted from the gateway 12. Also, the local server 48 can communicate with an access point 52, such as a wireless application protocol (WAP) or any other suitable device, which enables the local server 48 to enable CPEs 18 to access the data network, for example, via data packets. Naturally, the communications between the local server 48, the access point 52 and the CPEs 18 can occur over wireless connections, such as WiFi connections, as well as wired connections as understood in the art.

As with the controller 30 for a gateway 14, the controller 44 preferably includes a microcomputer with a control program that controls the terminal 16 as discussed herein. The controller 44 can also include other conventional components such as an input interface circuit, an output interface circuit, and storage devices such as a ROM (Read Only Memory) device and a RAM (Random Access Memory) device. The RAM and ROM store processing results and control programs that are run by the controller 44. The controller 44 is operatively coupled to the components of the user terminal 16 as appropriate, in a conventional manner. It will be apparent to those skilled in the art from this disclosure that the precise structure and algorithms for the controller 44 can be any combination of hardware and software that will carry out the functions of the embodiments of the present disclosure.

Figure 4:
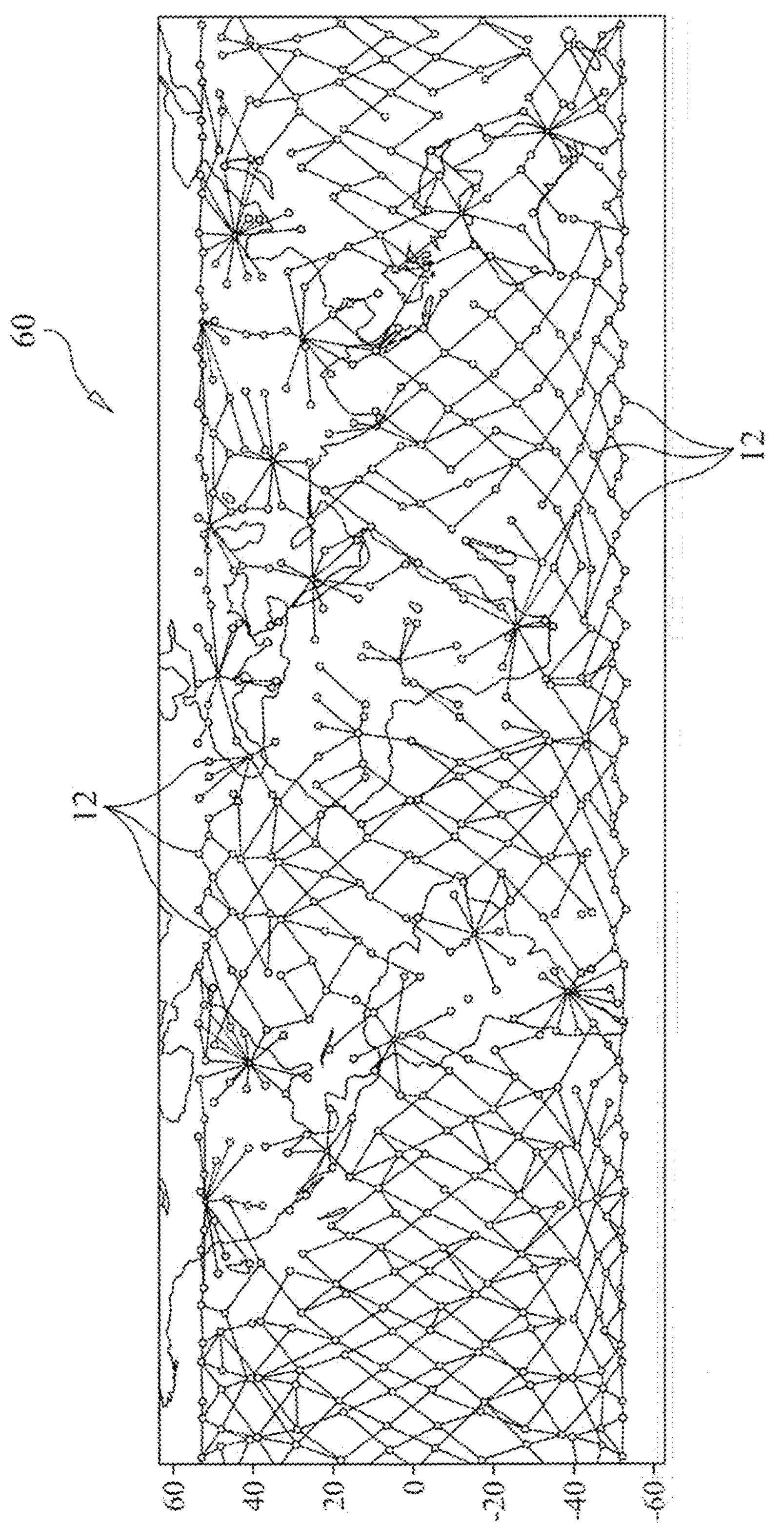
FIG. 4 illustrates an example embodiment of an inclined orbit constellation that can be improved in accordance with the systems and methods of the present disclosure.

FIG. 4 illustrates an example embodiment of a satellite communication system 10 having an inclined orbit constellation 60 in accordance with the present disclosure. The constellation 60 includes a plurality of satellites 12 in different locations. In the illustrated embodiment, the inclined orbit constellation 60 is a LEO constellation. The inclined orbit constellation 60 includes a plurality of satellites 12 which orbit the Earth with an orbit between 0° and 90° with respect to the equatorial plane. Typically, a satellite 12 having an inclined orbit has an orbit between 0° and 50-60° with respect to the equatorial plane. That is, the satellite 12 travels between about +/−50-60° degrees latitude with respect to the earth. The inclined orbit constellation 60 shown in FIG. 4 has its satellites 12 having inclined orbits up to about 60° latitude because the distribution of users is maximum in areas of large landmass up to about 60° latitude. These inclined orbits are intended to maximize the likelihood of an overhead satellite 12 (with high elevation) prioritizing areas with the most users. A satellite 12 instead having a polar orbit orbits the Earth at about 90° with respect to the equatorial plane. As discussed in more detail below, the systems and methods of the present disclosure can increase coverage in or near the north and south polar regions using only satellites 12 with inclined orbits and without a satellite 12 having a polar orbit. There may be specialist user terminals 16 with low density in the polar regions, for example, used by government, military or research users.

FIGS. 5 to 11 illustrate an example embodiment of how the systems and methods of the present disclosure improve satellite coverage for a target region. A target region can include a polar region, as illustrated for example by FIGS. 9A and 9B. A target region can also include a particular land mass, country, city, shipping channel or other area of interest, as illustrated for example by FIGS. 10 and 11. Those of ordinary skill in the art will recognize from this disclosure that a target region can include any region of interest as determined by the operator of the systems and methods of the present disclosure.

Figure 5:
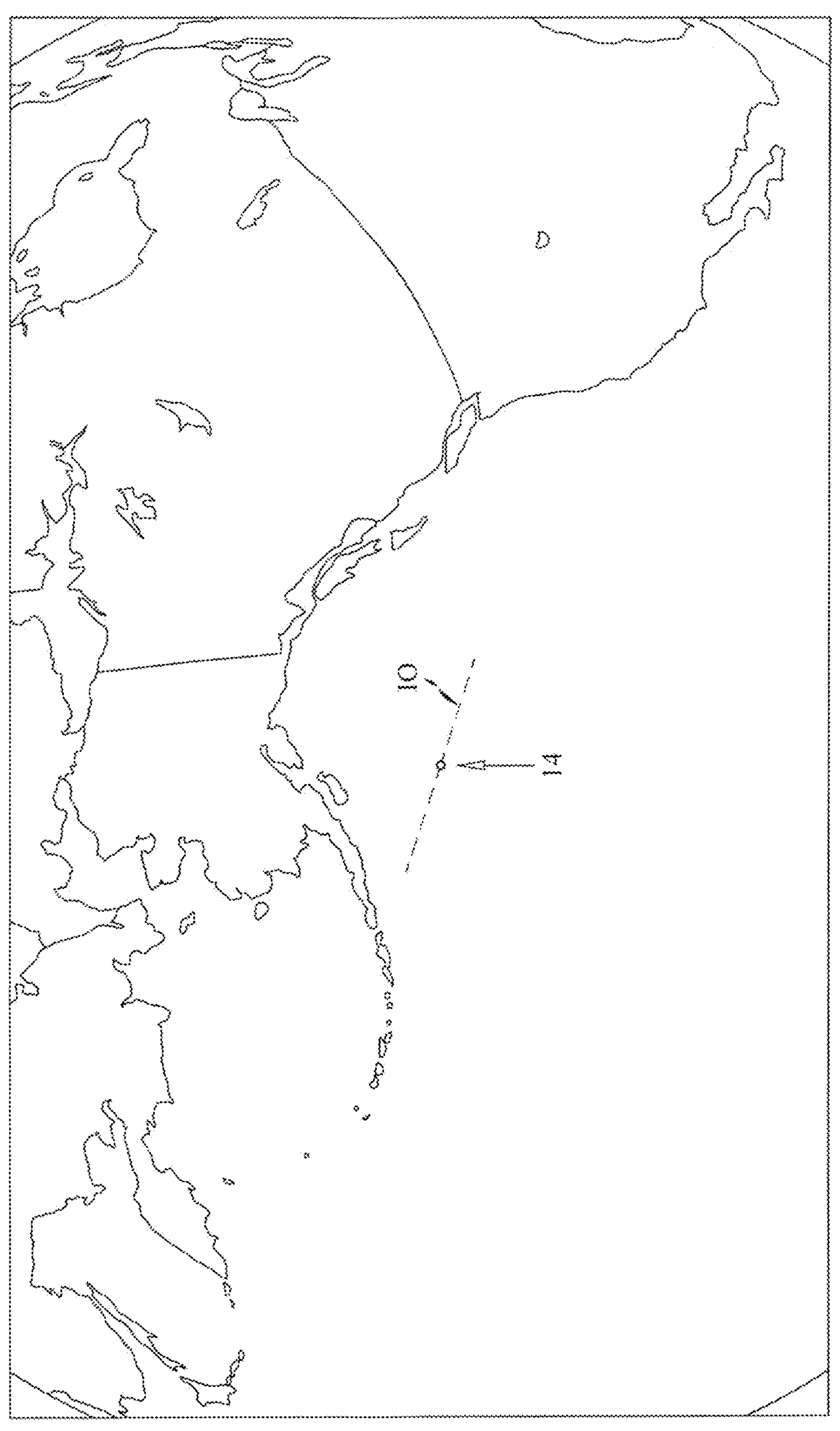
FIGS. 5, 6, 7 and 8 illustrate an example embodiment of improving satellite coverage in accordance with the present disclosure.
Figure 6:
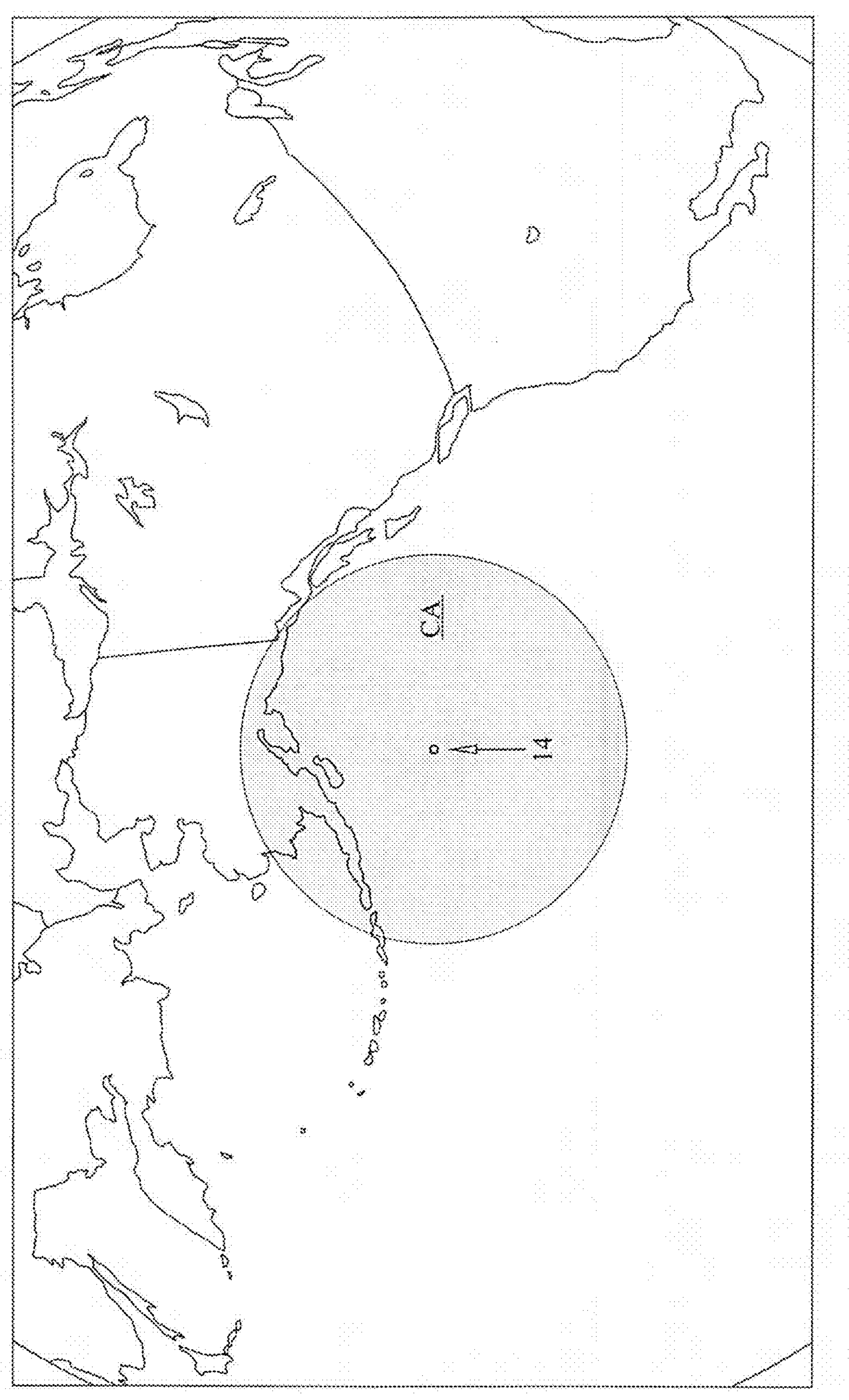
Figure 7:
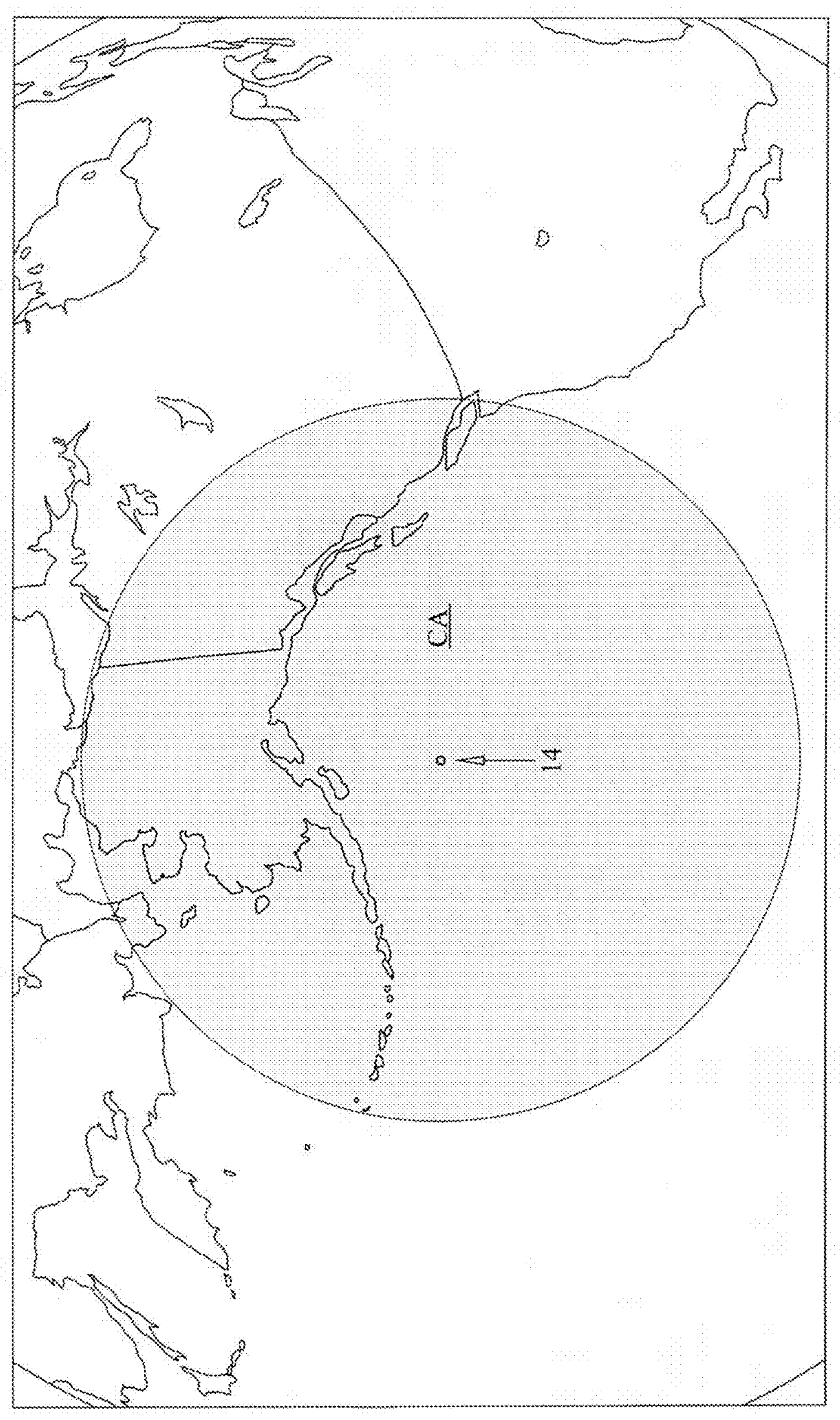

In FIGS. 5-8, the target region includes, for example, Alaska. The satellite 12 illustrated in FIGS. 5-8 has an inclined orbit with a 53° inclination at 674 km altitude in a northern-most flight path of the inclined orbit constellation 60. As illustrated, the satellite 12 is passing south of Alaska, which for reference has a northern border at around 71° latitude. FIG. 5 shows the satellite 12 passing south of Alaska along its inclined orbit IO. FIG. 6 shows the typical coverage area CA of the satellite 14 without implementing the systems and methods of the present disclosure. In FIG. 6, the antenna 22 of the satellite 12 is focused downward with its boresight pointed at the center of the Earth and has a typical antenna view angle of 51.7° to service a user terminal 16 elevation angle at 30°. As illustrated, the coverage area CA from the antenna 22 touches the southern coast of Alaska but does not otherwise service northern part of Alaska. As seen in FIG. 7, one way of broadening coverage to northern Alaska is to broaden the antenna view angle to 63.5° to increase the overall radius of the circular coverage area CA on the Earth's surface. However, increasing the coverage area CA in this way can be demanding on the antenna 22 design.

Figure 8:
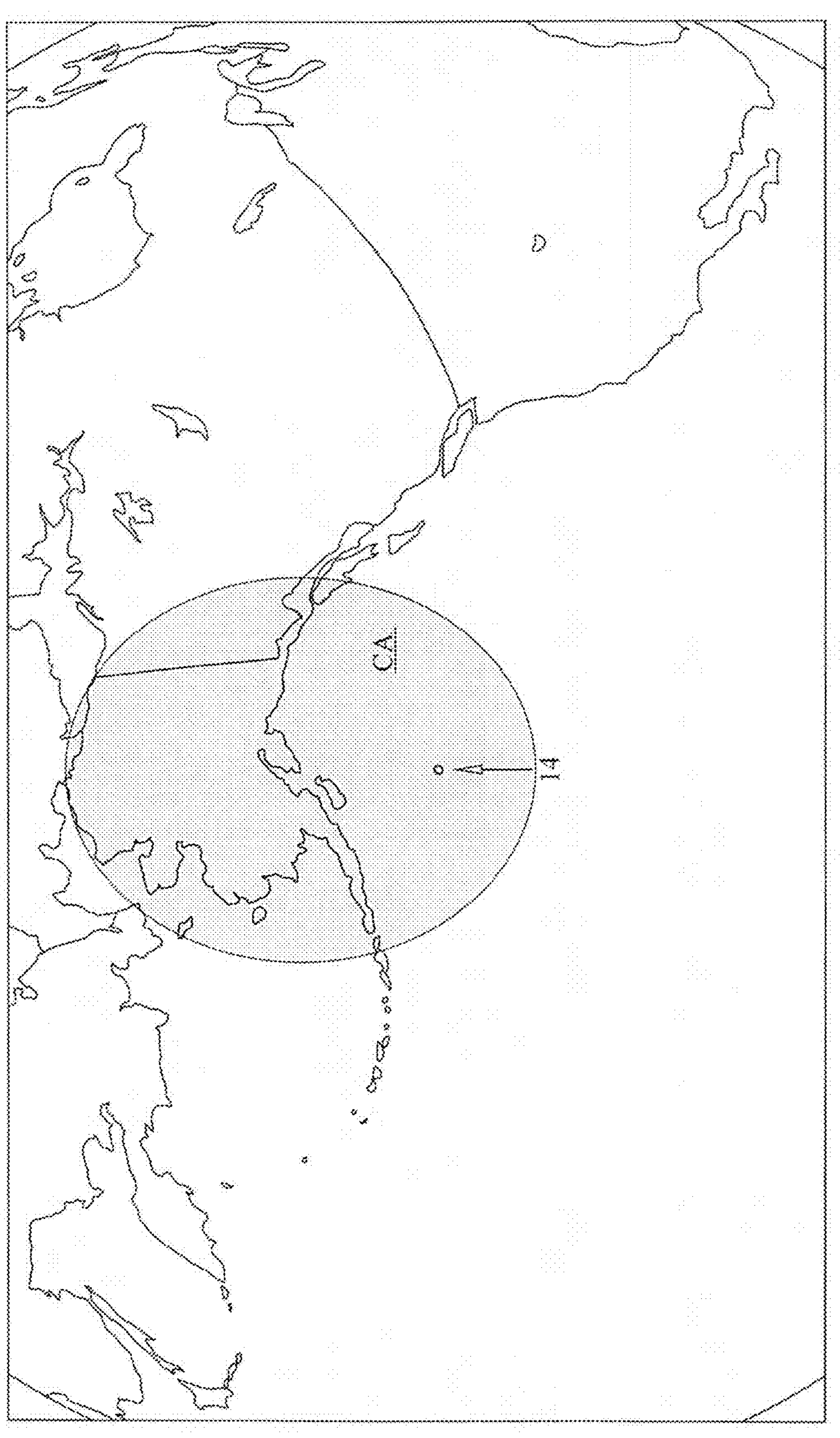

FIG. 8 illustrates how coverage can instead be improved by implementing the systems and methods of the present disclosure. In FIG. 8, the antenna 22 has been tilted northward 22° off the nadir to cover northern Alaska. The boresight of the antenna 22 has thus been tilted 22° to the north from its previous position along the nadir toward the center of the Earth. As seen in FIG. 8, this creates an elliptical or oval coverage area CA which covers northern Alaska. The coverage area CA in FIG. 8 covers more area to the north than the coverage area in FIG. 6, at the expense of covering less area to the south over the Pacific Ocean where coverage is not generally needed.

Figures 9A, 9B:
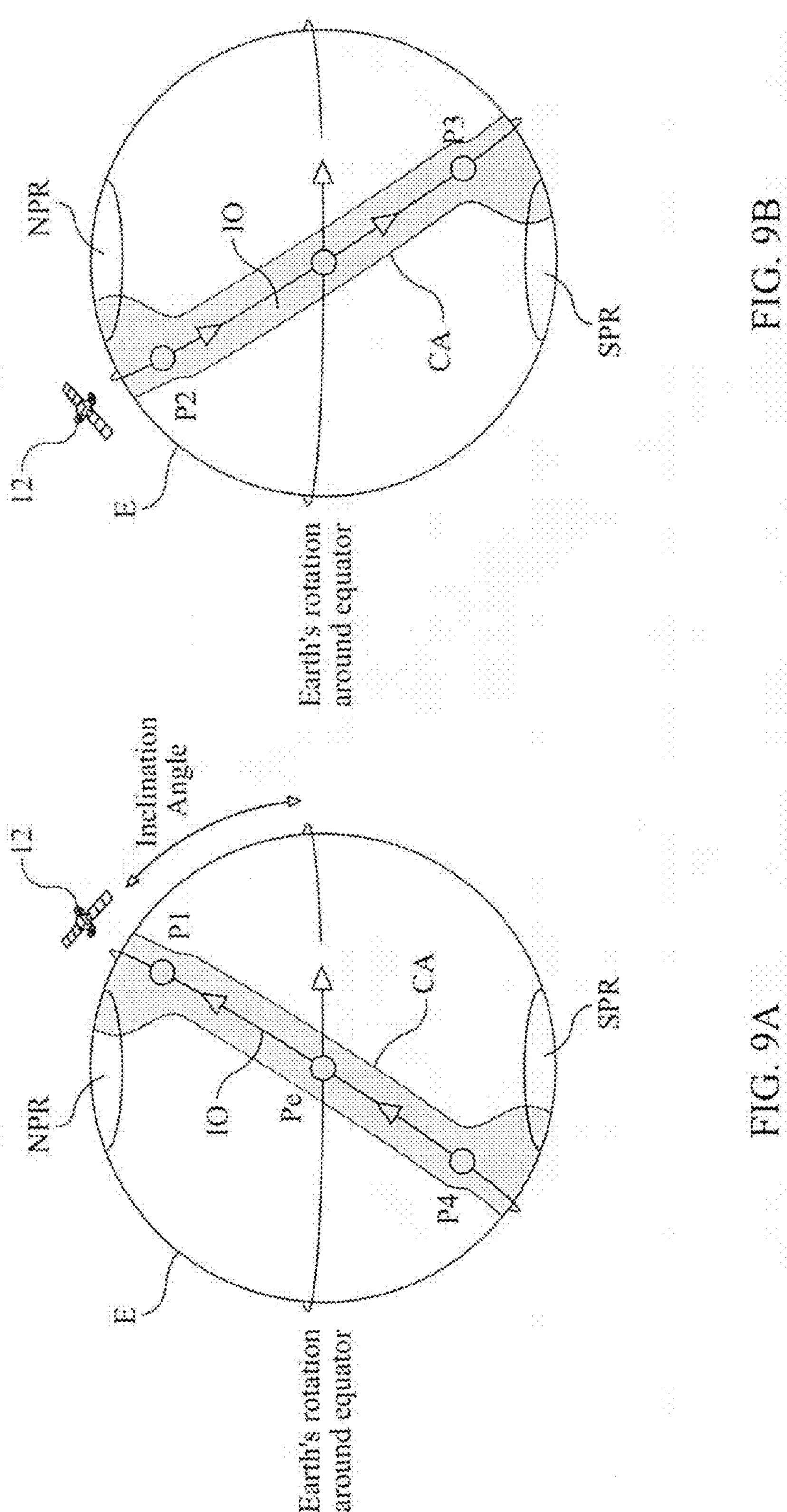
FIGS. 9A and 9B illustrate an example embodiment of a satellite operating in accordance with the systems and methods of the present disclosure.

FIGS. 9A and 9B illustrate an example embodiment of a satellite 12 traveling around the Earth E along an inclined orbit IO. FIG. 9A shows the satellite 12 for example from one side of the Earth E (e.g., one of the eastern or western hemisphere), while FIG. 9B shows the satellite on the opposite side of the Earth E (e.g., the other of the eastern or western hemisphere). Taken together, FIGS. 9A and 9B show one complete inclined orbit IO of a satellite 12 around the Earth E. As illustrated, the orbital inclination angle is the angle of the inclined orbit IO with respect to the equatorial plane. In the illustrated embodiment, the inclined orbit IO has an inclination of approximately 60°. FIGS. 9A and 9B illustrate five different points along the inclined orbit. Point Pe is at the equatorial plane, points P1 and P2 are located in the northern hemisphere, and points P3 and P4 are located in the southern hemisphere.

In FIG. 9A, beginning at point Pe at the equatorial plane, the satellite 12 is traveling north along its inclined orbit IO toward point P1. Between point Pe and point P1, the satellite 12 boresight is pointed toward the center of the Earth E (e.g. the boresight is approximately perpendicular to Earth's surface). Thus, between point Pe and point P1, the satellite coverage area CA extends approximately equally on each side of the inclined orbit IO.

When the satellite 12 reaches point P1 in FIG. 9A, the satellite 12 tilts the boresight of its antenna 22 northward towards the north polar region NPR, which increases the coverage area CA on the north side of the inclined orbit IO and decreases the coverage area CA on the south side of the inclined orbit IO. In the illustrated embodiment, this causes the coverage area CA to extend into the north polar region NPR and/or closer to the north pole as shown. As the satellite 12 moves from point P1 in FIG. 9A to point P2 in FIG. 9B, the satellite 12 maintains the northward tilt towards the north polar region NPR. Thus, the coverage area CA sweeps through the north polar region NPR between point P1 to point P2.

When the satellite reaches point P2 in FIG. 9B, the satellite 12 returns the antenna 22 to the angle used prior to point P1 (e.g. boresight pointed toward the center of the Earth E). The satellite 12 maintains the boresight in this position between point P2 and point P3. Thus, between point P2 and point P3, the satellite coverage area CA extends approximately equally on each side of the inclined orbit TO.

When the satellite 12 reaches point P3 in FIG. 9B, the satellite 12 tilts the boresight of its antenna 22 southward towards the south polar region SPR, which increases the coverage area CA on the south side of the inclined orbit IO and decreases the coverage area CA on the north side of the inclined orbit TO. In the illustrated embodiment, this causes the coverage area CA to extend into the south polar region SPR as shown. As the satellite moves from point P3 in FIG. 9B to point P4 in FIG. 9A, the satellite 12 maintains the southward tilt towards the south polar region SPR. Thus, the coverage area CA sweeps through the south polar region SPR between point P3 to point P4. In an embodiment, the southward tilt between points P3 and P4 is approximately the same angle as the northward tilt between points P1 and P2.

When the satellite reaches point P4 in FIG. 9A, the satellite 12 returns the antenna 22 boresight to the angle used prior to point P3 (e.g. boresight pointed toward the center of the Earth E). The satellite 12 maintains the boresight at this angle between point P4 and point P1. At point P1, the satellite 12 again tilts the boresight northward and repeats the cycle.

In an embodiment, the satellite 12 shown in FIGS. 9A and 9B maintains the same pattern for multiple orbits. In another embodiment, the points P1-P4 where tilting begins or ends change in latitude and/or longitude on subsequent orbits. In yet another embodiment, the satellite 12 boresight tilts at more or less at different points along the inclined orbit. For example, the satellite 12 can cause the tilt at the same latitudes but different longitudes on each subsequent orbit since the Earth E rotates at the same time as the satellite 12. The satellite 12 can also intentionally change the latitude and/or longitude coordinates for adjusting the antenna 22 boresight based on its relative positioning with respect to the Earth E on subsequent orbits.

In FIGS. 9A and 9B, points P1 and P3 are tilt points, while points P2 and P4 are return points. That is, the satellite 12 tilts the boresight of the antenna 22 off of the nadir at the tilt points P1, P3, and the satellite 12 returns the boresight of the antenna 22 to the nadir at the return points P2, P4. In alternative embodiments, the boresight of the antenna 22 can be tilted in other ways besides simply away from and back to the nadir. For example, the satellite 12 can tilt the boresight of the antenna 22 to a first tilt angle at a first tilt point, and can tilt the boresight of the antenna 22 from the first tilt angle to a second angle at a second tilt point. Similarly, the satellite 12 can return the boresight of the antenna 22 from the first or second tilt angles to a third tilt angle at a return point, with the third tilt angle being greater than zero with respect to the nadir. In another embodiment, the satellite 12 can tilt the boresight of the antenna 22 from the first or second tilt angles to a third tilt angle at a first return point, and can tilt the boresight of the antenna 22 from the third tilt angle to a fourth angle at a fourth tilt point.

In an embodiment, at least one controller 20, 30 is programmed with the coordinates of one or more tilt or return points, for example, points P1-P4 in FIGS. 9A and 9B. For example, at least one controller 20, 30 can be programmed with latitude and/or longitude coordinates of one or more points P1-P4. In an embodiment, at least one controller 20, 30 is also programmed with an amount of tilt for the boresight at a particular location. When the satellite reaches a point P1-P4, the controller 20, 30 causes the satellite 12 to tilt its boresight by the programmed amount. In an embodiment, at least one controller 20, 30 causes the satellite 12 to tilt its boresight by the programmed amount when the satellite 12 reaches a particular latitude and/or longitude. In an embodiment, at least one controller 20, 30 causes the satellite 12 to begin to tilt its boresight from an initial configuration (e.g., initial tilt angle or no tilt angle) at a first latitude (e.g., the latitude of the point P1 or P3), and return its boresight to the initial configuration at a second latitude (e.g., the latitude of the point P2 or P4). In an embodiment, at least one controller 20, 30 causes the satellite 12 to begin to tilt its boresight from an initial configuration (e.g., initial tilt angle or no tilt angle) at a first longitude (e.g., the longitude of the point P1 or P3), and return its boresight to the initial configuration at a second longitude (e.g., the longitude of the point P2 or P4).

In an embodiment, at least one controller 20, 30 is programmed to cause the satellite 12 to tilt its boresight based on time. For example, at least one controller 20, 30 can store a tilt time for tilting the boresight beginning at particular latitude and/or longitude coordinates. In an embodiment, when the satellite 12 reaches a particular latitude and/or longitude coordinate (e.g., a particular point), the controller 20, 30 causes the satellite 12 to tilt its boresight for the stored tilt time. When the tilt time elapses, the satellite 12 returns its boresight to an initial configuration (e.g., the initial tilt angle or no tilt angle) or shifts its boresight to a new tilt angle.

In an embodiment, at least one controller 20, 30 is programmed to determine an amount of tilt for the boresight of the antenna 22. More specifically, at least one controller 20, 30 is programmed to determine an amount of tilt for the boresight of the antenna 22 at a particular location. In an embodiment, at least one controller 20, 30 is configured to determine the amount of tilt based on the inclination of the inclined orbit IO of the satellite 12. In an embodiment, at least one controller 20, 30 is configured to determine the amount of tilt based on the height of the orbit of the satellite 12. In an embodiment, at least one controller 20, 30 is configured to determine the amount of tilt based on the field of view of the satellite 12 antenna 22. In an embodiment, at least one controller 20, 30 is configured to determine the amount of tilt based on the desired coverage extension (e.g., in latitude). In an embodiment, at least one controller 20, 30 is configured to determine the amount of tilt based two or more of the inclination of the inclined orbit, the height of the orbit, the field of view of the satellite antenna, and/or the desired coverage extension (e.g., in latitude). In an embodiment, at least one controller 20, 30 is configured to determine the amount of tilt based on the inclination of the inclined orbit, the height of the orbit, the field of view of the satellite antenna, and the desired coverage extension (e.g., in latitude). In an embodiment, the tilt angle $\phi$ to center the antenna boresight toward the user terminal 16 can be described as follows:

$$\phi = a\cos((s^2+(R_E+h)^2-R_E^2)/(2s(R_E+h))) \quad \text{(Equation 1).}$$

Figure 13:
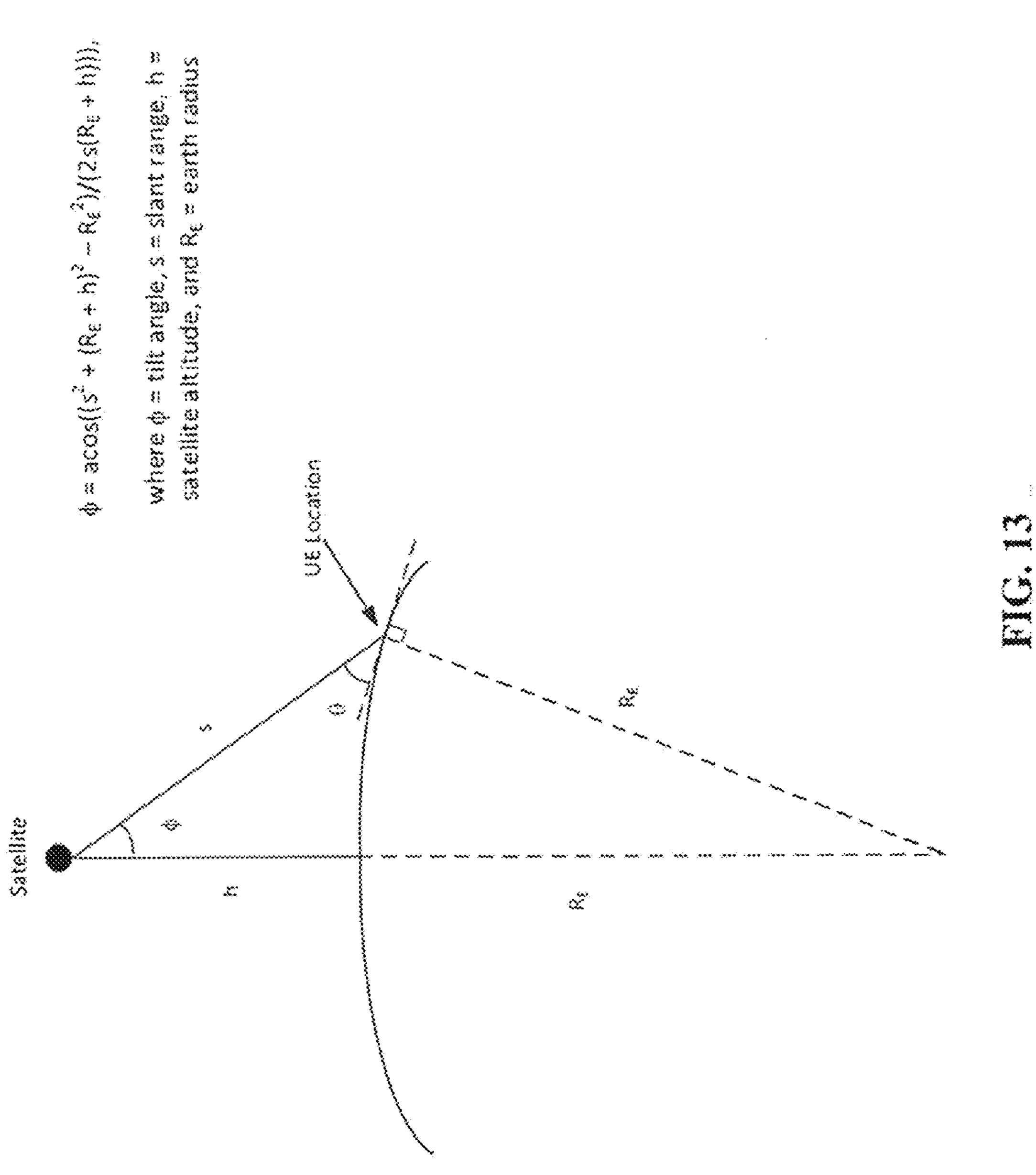
FIG. 13 illustrates an example equation that can be used to determine satellite boresight tilt in accordance with the systems and methods of the present disclosure.

In Equation 1, $\phi$ is the tilt angle, s is the slant range, h is the satellite altitude, and $R_E$ is the earth radius. These dimensions are also illustrated in FIG. 13. In an embodiment, at least one controller 20, 30 can determine these parameters and calculate the tilt angle $\phi$ for tilting the boresight.

In an embodiment, at least one controller 20, 30 is programmed to dynamically determine an amount of tilt based on a target region. For example, at least one controller 20, 30 can receive an inputted target region that needs to be covered by an existing satellite 12. The controller 20, 30 then determines when the satellite 12 will orbit within a particular distance of the target region. The particular distance can be a distance that the coverage area CA can effectively extend when the boresight is at a maximum effective tilt. The maximum effective tilt depends on orbital altitude and the antenna characteristics. If the current coverage area CA of the satellite 12 in its current configuration will not cover the target region, the controller 20, 30 can cause the satellite 12 to tilt the boresight of its antenna 22 at or near the target region to increase coverage at the target region. The controller 20, 30 can further cause the satellite 12 to tilt the boresight of its antenna 22 differently on subsequent orbits to provide the coverage area CA to the target region from different positions. The controller 20, 30 can also cause multiple satellites 12 to tilt their boresights towards the target region during their respective orbits.

In an embodiment, the controller 30 is configured to determine the tilt of a particular satellite 12 of a plurality of satellites 12 from a satellite constellation 60. For example, the controller 30 can receive an inputted target region that needs to be covered by an existing satellite constellation 60 having a plurality of satellites 12 with inclined orbits. The controller 30 is configured find one or more particular satellite 12 from the satellite constellation 60 with an orbit that reaches a particular distance from the target region but does not have a satellite coverage area CA that extends to the target region. The particular distance can be a distance that the coverage area CA can effectively extend when the boresight is at a maximum effective tilt. The controller 30 then causes the satellite 12 to tilt the boresight of its antenna 22 at or near the target region to increase coverage at the target region. For example, referring to FIG. 1, the controller 30 can determine which of satellite 12*a* and 12*b* has an inclined orbit that reaches a particular distance from the target region without its current coverage area CA extending to the target region, and the controller 30 can cause that satellite 12*a*, 12*b* to tilt the boresight of its antenna 22 at or near the target region to increase coverage at the target region. In an embodiment, the controller 30 can cause the satellite 12 to adjust the coverage area CA by sending updated programming instructions to the respective controller 20 of that satellite 12*a*, 12*b*, and then the controller 20 of that satellite 12*a*, 12*b* causes the tilt at the appropriate location. In an embodiment, the controller 30 can separately instruct the controllers 20 of each of multiple satellites 12*a*, 12*b* to cause the respective satellites 12*a*, 12*b* to tilt at particular locations on various orbits to increase coverage to the target region at different times.

Figure 10:
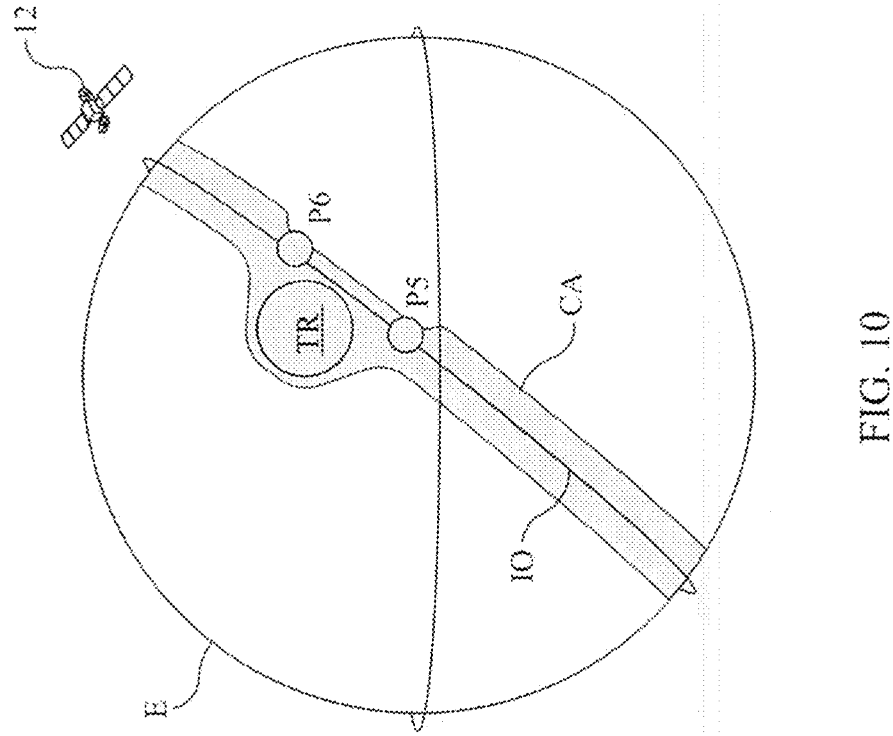
FIG. 10 illustrates another example embodiment of a satellite operating in accordance with the systems and methods of the present disclosure.

FIG. 10 illustrates another example embodiment of a satellite 12 traveling around the Earth E along an inclined orbit IO. FIG. 10 shows the same inclined orbit IO as FIGS. 9A and 9B, except that the boresight of the satellite 12 antenna 22 tilts between points P5 and P6 so as to provide better satellite coverage to target region TR. In FIG. 10, point P5 is a tilt point as discussed herein, and point P6 is a return point as discussed herein. The target region TR can include, for example, a land mass, a country, a city or other populated area, a shipping channel, or another area of interest. The north polar region NPR and south polar region SPR in FIGS. 9A and 9B can also be target regions TR. Although only one target region TR is shown in in FIG. 10, in an embodiment, the satellite 12 tilts the boresight of its antenna 22 at multiple locations along an inclined orbit IO to improve coverage at multiple target regions TR. The embodiment shown in FIG. 10 can also be combined with the embodiment shown in FIGS. 9A and 9B, so that the satellite 12 improves coverage at one or both polar regions NPR, SPR and also one or more other target regions TR during a same or multiple orbits.

In an embodiment, at least one controller 20, 30 is programmed to cause the satellite 12 to tilt its boresight to provide or improve satellite coverage to a target region TR. For example, the controller 20, 30 can receive an inputted target region TR to be covered. The controller 20, 30 then determines when a satellite 12 will orbit within a particular distance of the target region TR. The particular distance can be a distance that the coverage area CA can effectively extend when the boresight is at a maximum effective tilt. The controller 20, 30 then determines the tilt point (e.g., latitude and/or longitude along a particular inclined orbit IO) that the satellite 12 should adjust its boresight to extend the coverage area CA to the target region TR. The controller 20, 30 can also determine the return point to readjust or return the boresight after the orbit passes the target region TR. In an embodiment, the controller 20, 30 can determine a tilt time as discussed herein, after expiration of which the satellite 12 should readjust the boresight to a new configuration or return the boresight to its initial configuration.

Figure 11:
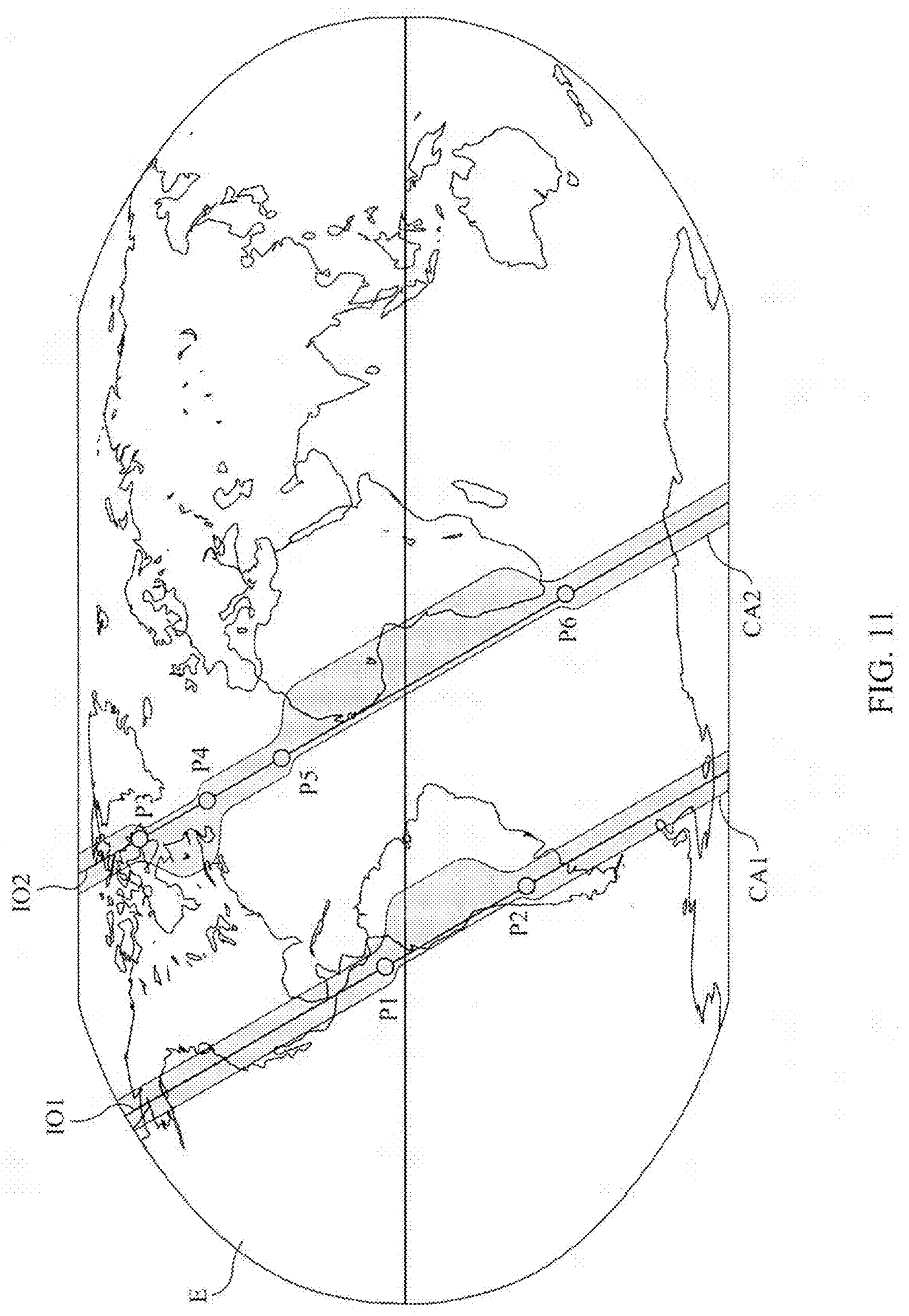
FIG. 11 illustrates another example embodiment of satellites operating in accordance with the systems and methods of the present disclosure.

FIG. 11 illustrates an example embodiment of how the systems and methods of the present disclosure can be implemented in practice. Specifically, FIG. 11 shows a first inclined orbit IO1 near the west coast of North America and South America and a second inclined orbit IO2 near the east coast of North America and the west coast of Africa. The first inclined orbit IO1 and the second inclined orbit IO2 can be orbits of a single satellite 12 or orbits of different satellites 12 (e.g., satellite 12*a* and satellite 12*b*). In FIG. 11, the satellite 12 moving along the first inclined orbit IO1 shifts its boresight between points P1 and P2 to increase coverage at a target region along the west coast of South America at the expense of decreasing coverage in the Pacific Ocean. That is, point P1 is a tilt point as discussed herein, and point P2 is a return point as discussed herein. Similarly, the satellite 12 moving along the second inclined orbit IO2 shifts its boresight between points P3 and P4 to increase coverage at a target region along the east coast of North America at the expense of decreasing coverage in the Atlantic Ocean. The satellite 12 moving along the second inclined orbit IO2 also shifts its boresight between points P5 and P6 to increase coverage at a target region along the west coast of Africa at the expense of decreasing coverage in the Atlantic Ocean. That is, points P3 and P5 are tilt points as discussed herein, and points P4 and P6 are return points as discussed herein.

In FIG. 11, the boresight tilting occurs at locations where the satellite 12 can increase satellite coverage over land at the expense of decreasing satellite coverage over an ocean. In an embodiment, at least one controller 20, 30 is configured to use the location of a satellite 12 with respect to land masses and water masses (e.g., oceans, lakes) to determine where to tilt or return the boresight. For example, at least one controller 20, 30 can determine one or more locations along an inclined orbit that a satellite's 12 coverage area CA will encompass both a land mass and a body of water simultaneously, and the controller 20, 30 can cause the satellite 12 to tilt its boresight towards the land mass at one or more of those locations. Alternatively, in another embodiment, a portion of a body of water can be deemed a target region, for example, when it includes a shipping channel. In that case, the controller 20, 30 can cause the satellite 12 to tilt its boresight towards the body of water at the target region. In yet another embodiment, a satellite 12 travelling over a land mass can shift its boresight to cover more land on a first side of the orbit at the expense of less land on an opposite second side of the orbit, for example, when the first side is deemed to include a target region.

In an embodiment, at least one controller 20, 30 is programmed to cause the satellite 12 to tilt its boresight to cover multiple target regions during a single orbit. For example, the satellite 12 moving along the second inclined orbit IO2 in FIG. 11 performs a first tilt of its boresight between points P3 and P4 and a second tilt of its boresight between points P5 and P6. In an embodiment, the first tilt and the second tilt are at the same angle. In another embodiment, the first tilt and the second tilt can be at different angles. Those of ordinary skill in the art will recognize from this disclosure that the tilt and return points will vary based on the path of the orbit in relation to target regions. Additionally, the satellite 12 moving along the second inclined orbit IO2 can also tilt its boresight to increase coverage at the polar regions as shown in FIGS. 9A and 9B.

In an embodiment, at least one controller 20, 30 is programmed to cause the satellite 12 to tilt its boresight to cover multiple target regions during subsequent orbits. A first orbit may take the satellite 12 in proximity with a first target region, and a second orbit may take the satellite 12 in proximity with a second target region. For example, a satellite 12 moving along the first inclined orbit IO1 and subsequently the second inclined orbit IO2 tilts its boresight to cover a first target region including the west coast of South America during the first inclined orbit IO1, and also tilts its boresight to cover second target regions including the east coast of North America and the west coast of Africa during the second inclined orbit IO2. Additionally, the satellite 12 moving along the second inclined orbit IO2 can also tilt its boresight to increase coverage at the north polar region NPR and/or the south polar region SPR during the first inclined orbit IO1 and/or the second inclined orbit IO2 as shown in FIGS. 9A and 9B.

In an embodiment, at least one controller 20, 30 is programmed to cause the satellite 12 to tilt its boresight in different directions during the same orbit. For example, the satellite 12 moving along the second inclined orbit IO2 in FIG. 11 performs a first southward tilt of its boresight between points P3 and P4 and a second northward tilt of its boresight between points P5 and P6.

In an embodiment, at least one controller 20, 30 is configured to coordinate multiple satellites 12 traveling along inclined orbits to increase overall coverage by a satellite constellation 60. For example, the controller 30 can be programmed with the orbital paths of a plurality of satellites 12 in a constellation 60. Based on the orbital paths, the controller 30 can determine where there are gaps in coverage. The controller 30 can also determine where there are overlaps in coverage areas between two satellites 12*a*, 12*b*. The controller 30 can then instruct the controller 20 of one of the satellites 12*a*, 12*b* to tilt to extend its coverage area CA into the gap in coverage and/or away from an overlap in coverage.

In an embodiment, at least one controller 20, 30 is configured to coordinate multiple satellites 12 so that any loss in coverage by a first satellite 12*a* having a tilted boresight as discussed herein can be made up for by tilting the boresight of one or more second satellites 12*b*. For example, the controller 20, 30 can cause a first satellite 12*a* to tilt its boresight to cover a target region on a first side of its orbit at the expense of less coverage of a second region on an opposite second side of its orbit, as discussed herein. The controller 20, 30 can also determine which of a plurality of second satellites 12*b* have an orbit enabling coverage of the vacated second region. The controller 20, 30 can cause one or more of the second satellites 12*b* to tilt their boresights to provide coverage to the second region, so as to avoid gaps in coverage to the extent possible while the first satellite 12*a* tilts its boresight away from the second region.

The systems and methods of the present disclosure can also be used to improve a constellation 60 that shuts off one or more satellites 12 in certain areas to prevent interference. In some constellations 60 this occurs, for example, at the edge of latitude limits where the constellation 60 has many satellites 12 that can interfere with each other (e.g., at the north and south latitude limits shown in FIG. 4). Instead of shutting off satellites 12, certain satellites 12 can have their boresights tilted in accordance with the present disclosure. For example, on the northern side of the Earth, every other satellite 12 in every other plane can tilt its boresight northward to cover a region slightly beyond northern region of its flight path. Likewise, on the southern side of the Earth, every other satellite 12 in every other plane can tilt its boresight southward to cover a region slightly beyond southern region of its flight path. Alternatively, certain satellites 12 can be pointed towards landmasses, countries, cities, shipping lanes, or other target regions. In an embodiment, at least one controller 20, 30 is configured to decrease interference between two satellites 12 by tilting the boresight of one or both of the satellites 12. In an embodiment, the controller 20, 30 can determine when there are multiple satellites in the same vicinity, and tilt one or more satellites 12 in accordance with the systems and methods disclosed herein to decrease the interference between the satellites 12.

In an embodiment, at least one controller 20, 30 dynamically determines a target region than needs satellite coverage and causes a satellite 12 to tilt its boresight to provide that coverage. For example, the controller 20, 30 can determine that a minimum number of potential satellite users are located in a particular area. Based on the minimum number of users, the controller 20, 30 can deem that particular area to be a target region that needs consistent coverage. The controller 20, 30 can then analyze existing satellite 12 orbit patterns and instruct one or more satellites 12 to tilt their boresights towards the new target region during their existing orbits to make up for any gaps in coverage. In an embodiment, the potential satellite users are roaming users that have been detected in that area by other satellites 12.

In an embodiment, a satellite 12 is configured to dynamically adjust the tilt of its boresight at different points in its orbit. FIG. 12 illustrates an example embodiment of a satellite 12 configured to dynamically adjust the tilt of its housing 62 and thus the tilt of its boresight. In the illustrated embodiment, the satellite 12 includes a controller 20, an antenna 22 (see FIG. 1), a housing 62, a reaction or momentum wheel 64 ("reaction wheel 64"), and a motor 66. The motor 66 is coupled to the reaction wheel 64 and is configured to cause the reaction wheel 64 to rotate. The controller 20 controls the motor 66 to determine when the reaction wheel 64 rotates.

In FIG. 12, the reaction wheel 64 is configured to orient the satellite 14 to alter the pointing of its antenna 22 used for communication with the user population on the ground. The reaction wheel 64 can be used for three-axis attitude control. In an embodiment, a control momentum gyroscope (CMG) includes a reaction wheel 64 mounted in a one-axis or two-axis gimbal. When mounted to a rigid satellite 12, applying a constant torque to the reaction wheel 64 using one of the gimbal motors causes the satellite 12 to develop a constant angular velocity about a perpendicular axis, thus allowing control of the satellite's 12 pointing direction.

In an embodiment, the reaction wheel 64 is aligned to control the satellite 12 in the north/south direction. As seen in FIG. 12, the angular momentum caused by the reaction wheel 64 causes the housing 62 of the satellite 12 to rotate in the opposite direction. With the reaction wheel 64 aligned in the north/south direction, the controller 20 can cause the satellite 12 to tilt its boresight in the north/south direction by rotating the reaction wheel 14. The reaction wheel 64 can thus be used to adjust north/south tilt in real time and under control from the ground (e.g., controlled by the gateway 14). This allows the coverage area CA of a satellite 12 to be altered as needed. The satellite orientation control can be autonomous, not requiring control from the ground and instead being controlled by the controller 20 as needed. For example, the controller 20 can be programmed to adjust the tilt of the boresight in different ways (e.g., different directions, different angles) as the satellite 12 passes over different target regions.

In an embodiment, the reaction wheel 64 can also be used to control the east/west direction, for example, to target specific target regions. For example, as shown in FIG. 11, a satellite 12 over the ocean can tilt back to land to the east or west to increase capacity in areas of countries, cities, shipping channels, or other target regions. In an embodiment, the antenna boresight can be tilted east/west to better cover landmasses in the equatorial region. For example, as seen in FIG. 4, more inclined orbit satellites 12 are concentrated in the region outside 40° latitude N or S, so the antenna boresight of one or more satellites 12 can be tilted east/west between about 20° N and S to better cover this region.

In an embodiment, the reaction wheel 64 can be used to control the north/south direction, the east/west direction, and/or any direction in between. When the boresight needs to be tilted, the controller 20 first adjusts the reaction wheel 64 to be aligned in the correct direction for tilting. The controller 20 then causes the reaction wheel 64 to rotate so as to cause the tilt in the aligned direction.

For a LEO system, use of the reaction wheel 64 for selective tilting allows a satellites 12 to be on an increased orbital incline while only having a very small impact on the capacity of the system 10 in the areas of highest user density. This can be achieved, for example, by orbiting the satellites 12 to higher latitudes to the north and then tilting the satellites 12 at max latitude slightly towards the south if they are not being used for north polar coverage. This maintains system capacity as high as possible for areas slightly to the south of max orbital latitude. When satellite coverage toward the north polar region is required, specific satellites 12 are tilted in a northward direction only as required. An example would be if service is required by some users in the north of Canada/Alaska but not over Siberia, only satellites 12 flying over appropriate longitudes are tilted. This allows the impact on capacity in other regions of the Earth to be kept to a minimum. Although the above procedure is described with respect to satellites 12 near the north polar region, the same procedure can also be applied to satellites 12 near the south polar region using tilting in the opposite directions.

Tilting of satellites 12 flying over empty ocean regions allows system capacity over land area to be increased. Using the reaction wheel 64, this tilting can be dynamically controlled as needed. The extra power required for this adjustment is minimal or zero since the satellites 14 are normally stabilized by their reaction wheels 64. Tilting is a bias on the stabilization.

While tilting, biasing, and changing the boresight of a satellite antenna 22 have been described with respect to using a reaction wheel 64, such adjustments may also be performed using propulsion systems and the like, or a combination of systems, which are also contemplated. For example, a satellite 12 can include a propulsion systems that causes the housing 62 and thus the attached antenna 22 to tilt. In an example embodiment, the satellite 12 can include one or more thrusters which cause the housing 62 and thus the attached antenna to rotate in a manner similar to that described above with respect to FIG. 12. In an embodiment, the thrusters are individually movable with respect to the housing 64, such that the controller 30 can move the thrusters into the appropriate position to tilt the housing 62 in a desired direction. For example, the thrusters can be mounted to a one-axis or two-axis gimbal or another similar mechanism. In an embodiment, the controller 20 is programmed to move and control the thrusters to achieve the tilt required to extend a coverage area CA to a particular target region as described herein. For example, the controller 20 first adjusts one or more thruster individually to be aligned in the correct direction for tilting, and then activates the one or more thruster so as to cause the tilt in the aligned direction.

Further, while the various aspects have been described with respect to tilting or changing the inclination of the housing 62 of the satellite 12, changes to the inclination of one or more antennas 22 with respect to other portions of the satellite 12, or a combination of both, are also contemplated. For example, the antenna 22 can be attached to the housing 62 or another portion of the satellite 12 using a one-axis or two-axis gimbal or another similar mechanism. The controller 20 can tilt the antenna 22 with respect to the housing 62 or other portion of the satellite 12 to achieve the desired boresight tilt. In another embodiment, such movement of the antenna 22 with respect to other portions of the satellite 12 can be combined with the reaction wheel 64, thrusters, or another mechanism which rotates the satellite 12. For example, the controller 20 can both rotate the satellite 12 as a whole and rotate the antenna 22 with respect to the satellite 12 to achieve the desired tilt. Those of ordinary skill in the art will also recognize alternative ways of achieving the desired tilt besides those described herein.

The embodiments described herein provide improved systems and methods for maximizing service coverage using a fewer number of satellites. These systems and methods are advantageous, for example, because they enable polar regions to be covered without dedicated satellites for those regions. It should be understood that various changes and modifications to the systems and methods described herein will be apparent to those skilled in the art and can be made without diminishing the intended advantages.

General Interpretation of Terms

In understanding the scope of the present disclosure, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present disclosure, it will be apparent to those skilled in the art from this disclosure that various changes and modifications can be made herein without departing from the scope of the disclosure as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description by the applicant, including the structural and/or functional concepts embodied by such features. Thus, the foregoing descriptions of the embodiments are provided for illustration only, and not for the purpose of limiting the appended claims and their equivalents.

What is claimed is:

1. A satellite communication method comprising:

providing a satellite communication system including a plurality of satellites having inclined orbits; and programming a controller of at least one of the satellites of the plurality of satellites on an inclined orbit (i) to adjust a tilt of at least one antenna on the at least one satellite to a north side of an orbital path when the at least one satellite reaches a north polar region so as to increase satellite coverage at the north polar region on the north side of the orbital path and decrease satellite coverage on a south side of the orbital path and (ii) to adjust the tilt of the at least one antenna on the at least one satellite to the south side of the orbital path when the at least one satellite reaches a south polar region so as to increase satellite coverage at the south polar region on the south side of the orbital path and decrease satellite coverage on the north side of the orbital path.

2. The method of claim 1, wherein the satellite communication system is a Low Earth Orbit satellite communication system.

3. The method of claim 1, comprising:

dynamically adjusting the tilt of the at least one antenna on the at least one satellite as the at least one satellite approaches an additional target region.

4. The method of claim 3, wherein the additional target region includes a land mass, a country, a city or a shipping channel.

5. The method of claim 1, comprising adjusting the tilt of the at least one antenna by a programmed amount when the at least one satellite reaches a particular latitude and/or longitude.

6. The method of claim 1, comprising adjusting a boresight of the at least one antenna off of a nadir when the at least one satellite reaches a tilt point, and returning the boresight of the at least one antenna to the nadir when the at least one satellite reaches a return point.

7. The method of claim 1, comprising adjusting the tilt of the at least one antenna on the at least one satellite so as to create an elliptical coverage area.

8. A satellite communication system comprising:

a plurality of satellites having only inclined orbits and not including a satellite having a polar orbit; and a controller programmed (i) to adjust a tilt of at least one antenna on at least one satellite of the plurality of satellites on an inclined orbit to a north side of an orbital path when the at least one satellite reaches a north polar region so as to increase satellite coverage at the north polar region on the north side of the orbital path and decrease satellite coverage on a south side of the orbital path and (ii) to adjust the tilt of the at least one antenna on the at least one satellite to the south side of the orbital path when the at least one satellite reaches a south polar region so as to increase satellite coverage at the south polar region on the south side of the orbital path and decrease satellite coverage on the north side of the orbital path.

9. The satellite communication system of claim 8, wherein the plurality of satellites include Low Earth Orbit satellites.

10. The satellite communication system of claim 8, wherein the controller is programmed to dynamically adjust the tilt of the at least one antenna as the at least one satellite approaches an additional target region, the additional target region including a land mass, a country, a city or a shipping channel.

11. The satellite communication system of claim 8, wherein the controller is configured to adjust the tilt of the at least one antenna by a programmed amount when the at least one satellite reaches a particular latitude and/or longitude.

12. A satellite comprising:

a housing;

an antenna configured to create a coverage area for communication with user terminals; and a controller programmed (i) to adjust a tilt of the antenna to a north side of an orbital path of an inclined orbit as the satellite approaches a north polar region so as to increase the coverage area for the north polar region on the north side of the orbital path and decrease the coverage area on a south side of the orbital path and (ii) to adjust the tilt of the antenna to the south side of the orbital path of the inclined orbit as the satellite reaches a south polar region so as to increase the coverage area at the south polar region on the south side of the orbital path and decrease the coverage area on the north side of the orbital path.

13. The satellite of claim 12, comprising a reaction wheel controlled by the controller to cause the tilt.

14. The satellite of claim 12, wherein the controller is configured to dynamically adjust the tilt so as to adjust the coverage area differently for additional target regions.

15. The satellite of claim 12, wherein the controller is located within the housing.

16. The satellite of claim 14, wherein the additional target regions include at least one of a land mass, a country, a city or a shipping channel.

* * * * *